United States Patent [19]

Schindler

[11] 4,347,513
[45] Aug. 31, 1982

[54] NETTED SEARCH RADAR SYSTEM

[75] Inventor: John K. Schindler, Chelmsford, Mass.

[73] Assignee: The United States of America as represented by the Secretary of the Air Force, Washington, D.C.

[21] Appl. No.: 185,469

[22] Filed: Sep. 9, 1980

Related U.S. Application Data

[63] Continuation-in-part of Ser. No. 47,527, Jun. 8, 1979, abandoned.

[51] Int. Cl.³ .................. G01S 7/38; G01S 13/74; G01S 13/48
[52] U.S. Cl. .................. 343/18 E; 343/6.5 R; 343/15
[58] Field of Search .................. 343/6.5 R, 15, 18 E, 343/6.5 LC

[56] References Cited

U.S. PATENT DOCUMENTS

| | | | |
|---|---|---|---|
| 3,184,739 | 5/1965 | Franklin et al. | 343/15 |
| 3,222,672 | 12/1965 | Forestier | 343/7.5 |
| 3,810,179 | 5/1974 | Merrick | 343/6.5 LC |
| 3,821,751 | 6/1974 | Loos | 343/5 R |
| 3,949,397 | 4/1976 | Wagner et al. | 343/18 E X |
| 3,997,898 | 12/1976 | Le Grand | 343/6.5 R |
| 4,115,772 | 9/1978 | Valdes | 343/6.5 R |
| 4,179,695 | 12/1979 | Levine et al. | 343/6.5 R |

Primary Examiner—Malcolm F. Hubler
Attorney, Agent, or Firm—Donald J. Singer; William Stepanishen

[57] ABSTRACT

A netted, search radar system to defeat monopulse antiradiation missiles utilizing a plurality of search radars scanning asynchronously with differently coded signals. The coded pulse trains from each radar precisely timed and frequency locked to one another in order that all radar units simultaneously emit pulses on or at substantially the same r.f. carrier frequency.

8 Claims, 1 Drawing Figure

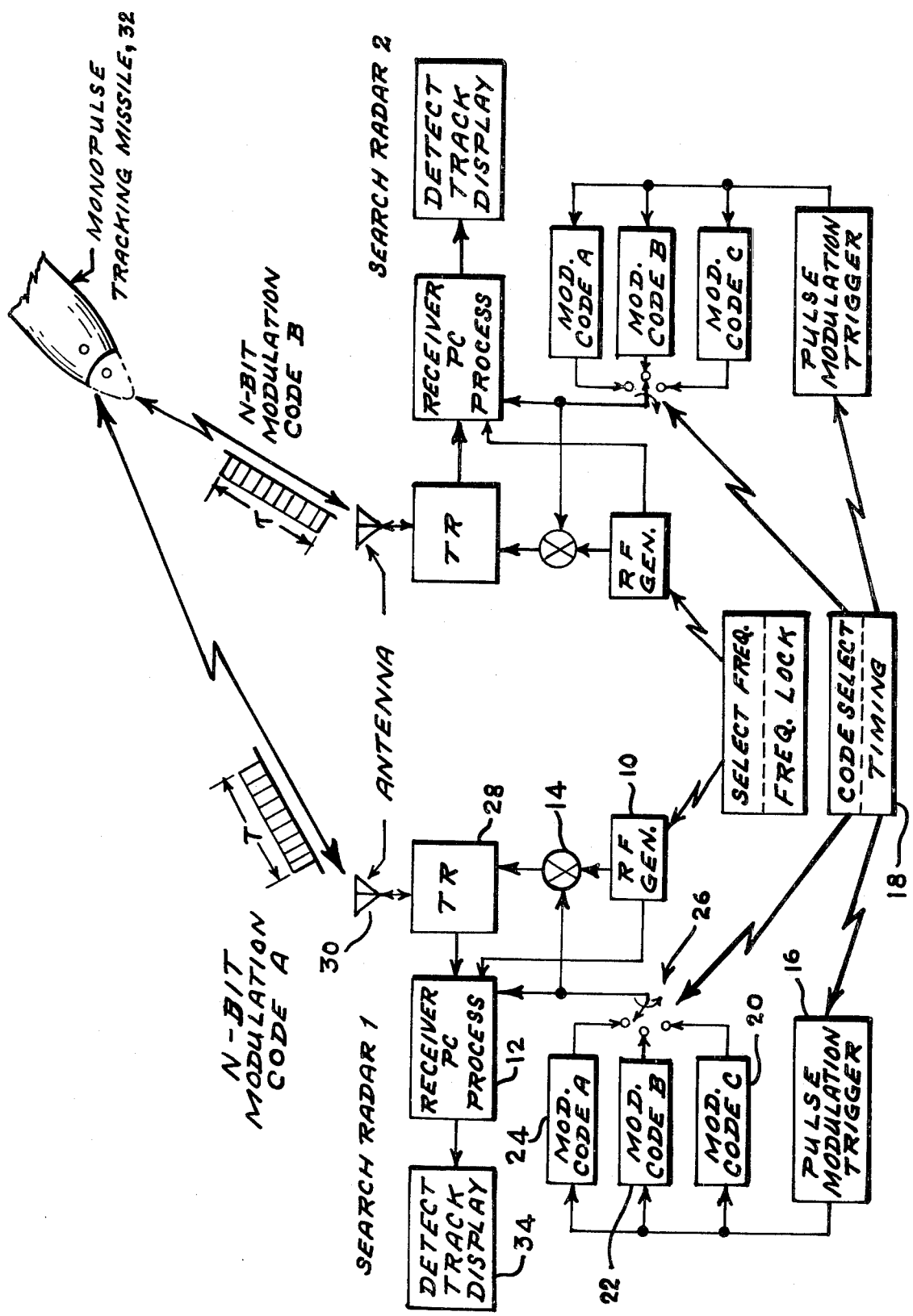

NETTED SEARCH RADAR SYSTEM

STATEMENT OF GOVERMENT INTEREST

The invention described herein may be manufactured and used by or for the Government for governmental purposes without the payment of any royalty thereon.

CROSS-REFERENCE TO RELATED APPLICATION

This is a continuation-in-part of co-pending patent application Ser. No. 047,527 filed Jun. 8, 1979, now abandoned.

BACKGROUND OF THE INVENTION

The present invention relates broadly to a search radar system, and in particular to a netted search radar system to defeat monopulse anti-radiation missiles.

In the prior art, the anti-radiation missile presents a serious threat to the survival of current and future surveillance radars which operate under combat conditions. The missile uses monopulse techniques to accurately seek and destroy the source of periodic radar emissions. A number of countermeasures may be employed to defend against a anti-radiation missile (ARM) attack. One of these countermeasures is the ARM alarm, which is a decoy emission that is intended to lure the missile away from its intended target, surveillance radars. The use of low sidelobe antennas and controlled radar emissions such as netted radar blinking or individual radar blanking are intended to break the lock of the missile tracking system.

These anti-radiation missiles countermeasures may successfully deny destruction of the surveillance radar under attack, but do have some undesirable limitations. During the operation of these countermeasures, the search functions of the surveillance radar must be temporarily interrupted. The frequency and duration of the individual interruptions may cause loss of track, and associated track mis-identification of both friendly and hostile aircraft. During the interval that the surveillance radars must suspend their operations, the functions of the radar such as the early warning, intercept and air traffic control functions, are severely curtailed. The present invention provides a viable alternative to prior art defense techniques.

SUMMARY OF THE INVENTION

The present invention utilizes a plurality of radar units which operate as a netted group. This plurality of netted radars comprise, at least, a set of two or more physically separated search radars scanning asychronously. However, individual pulse emissions from each radar are carefully timed and frequency locked so that all radars emit pulses simultaneously on nearly the same r.f. carrier frequency. The individual pulses in the r.f. emission from each radar are amplitude and/or phase coded so that upon pulse compression of the radar's own emission, a low range sidelobe autocorrelation results. In addition, cross correlation of the coded waveforms from distinct radars is minimal. The simultaneous radar emissions appear to introduce wideband angular scintillation or radar angle noise into the missile tracking system.

It is one object of the present invention, therefore, to provide an improved netted search radar system to defeat monopulse-tracking anti-radiation missiles.

It is another object of the invention to provide an improved netted search radar system utilizing a plurality of netted radar units which are synchronized and frequency stabilized with respect to one another.

It is another object of the invention to provide an improved netted search radar system utilizing dissimiliar orthogonal amplitude and/or phase codes to permit simultaneous, non-interference operation between radar units.

It is yet another object of the invention of provide an improved netted search radar system to introduce monopulse tracking noise into an anti-radiation missile system.

These and other advantages, objects and features of the invention will become more apparent from the following description taken in connection with the illustrative embodiment in the accompanying drawing.

BRIEF DESCRIPTION OF THE DRAWING

The FIGURE is a block diagram of the netted search radar system in accordance with the present invention.

DESCRIPTION OF THE PREFERRED EMBODIMENT

Referring now to the FIGURE, there is shown a netted search radar system utilizing for the present example a pair of search radar units which are scanning asynchronously and are physically remote in a fixed, known position with respect to one another. Both radar units utilize the same components and units except for some minor code selection variations. While the codes utilized by both radar units may be the same, the variations relate to the selection of a non-similiar code during a given operational sequence. For the present example, only the units of search radar one will be described, however, it should be clearly understood that search radar two contains the same units. It should be further understood that it is not the intention of the present disclosure to limit the scope of the present invention to only two netted search radar units.

In search radar one, the RF generator unit 10 provides a carrier frequency to receiver/processor unit 12 and multiplier unit 14. The pulse modulation trigger unit 16 which is activated by the code select timing unit 18, applies a trigger signal to modulation code units 20, 22, 24. Each code unit 20, 22, 24 provides a separate and distinct code which may be selected by the code select timing unit 18 positioning the switch 26 to apply the desired code to both the receiver process or unit 12 and the multiplier 14. The output from the multiplier is applied through the T/R switch 28 to the antenna 30. The return signal from the target 32 is routed through the antenna 30 and the T/R switch 28 to the receiver pulse compression processor unit 12. The target signal is processed in the receiver pulse compression processor unit 12, which may be of the type described as a matched filter and correlator processor, the implementation of which is described in Chapter 20 of "Radar Handbook" McGraw Hill 1970. The processed and detected signal is displayed by the detect-track display unit 34. The present operation applies to the two search radars shown in the Figure as well as any number of additional radars which may be operated in the net provided a sufficient set of orthogonal pulse codes is developed for the additional units.

Each radar in the net comprises of a conventional, coherent surveillance radar with the exceptions noted herein. Each radar possesses a conventional coherent r.f. generator capable of being pulse amplitude and/or phase code modulated at r.f. or at some IF frequency. The modulated emissions are radiated after passing a TR switch or some other means of isolating the sensitive receiver from the high level transmitter energy. Upon reception of the received r.f. energy from a target, the energy is passed through the TR switch to the radar receiver-processor. The coherent receiver-processor may be a conventional design with provision for pulse compression of the amplitude and/or phase modulation of the received signal, MTI or pulse doppler processing, detection indication with appropriate CFAR/clutter thresholding and tracking if necessary. The search radars have particular properties which should be pointed out. First, the r.f. carrier frequency can be periodically locked to an external source and remain stable within system limits. Second, multiple amplitude or phase codes are selectable by a signal from an external source. The pulse amplitude and/or phase codes modulate the radar emission and are used in the radar receiver to correlate or pulse compress the signal received by the radar. Third, the r.f. carrier frequency of the radar emission is capable of being selected from the external location to permit frequency hopping of the radars for ECCM purposes but to ensure that both radars operate on the same selected frequency. Finally, the pulse modulation trigger is capable of being timed from an external source which synchronizes the triggers and specifies the delay of each modulation trigger from the synchronizing signal. The delay is required to ensure that the modulated radar emissions exhibit the greatest overlap in the surveillance volume of the most likely anti-radiation missile attack.

In order to more fully understand the operating principles of the present invention, a brief review of the fundamental properties of a monopulse tracking system will be presented. Both amplitude and phase monopulse systems effectively measure the local orientation of the phase front of the r.f. emission at the position of the monopulse system. If the phase front results from physically separated radar emissions, the phase front normal or effective position of the radars may be significantly separated from the actual radar position. The effective radar position depends upon the relative phase and amplitude of the radar emissions. For example, with two sources of equal strength, the apparent position is midway between the sources when the sources are in phase and totally random (noise limited) when the sources are out of phase. If one source dominates in amplitude, the second source generates position errors centered around the dominant source.

The individual pulsed emission from the present invention are phase and/or amplitude coded. Thus each pulse emission will present a wideband sequence of phase front orientations or direction errors to the missile tracking system, effectively introducing white tracking noise into the system. The effectiveness of the ARM countermeasure described here depends on the effective rms power of the white tracking noise, the increase in missile CEP which it introduces and the lethal area covered by the missile explosives.

The search radars in the net therefore operate with the following parameters:

1. The scanning of the individual radars in the net need not be synchronized. However, superior performance would result if the radars are synchornized to simultaneously scan high ARM threat areas.

2. The phase of the r.f. emission from any individual radar with respect to the other radars may be random and may vary from pulse to pulse, in other words, no relative phase stabilization of the radar r.f. sources is required.

3. The white noise introduced into the missile monopulse tracker is due to the successive amplitude and/or phase changes in the overlapping pulse emissions from each radar at the missile location. To insure overlap of two or more pulses, the following provisions should be observed (a) In each system, the triggers which initiate the pulse emissions from each radar must be synchronized, probably from some external source common to all radars in the net. (b) The temporal extent T (shown in the Figure) of the pulse emissions must be long such that there is significant pulse overlap when compared to T over a large portion of the surveillance region where ARM attack is likely. (c) Precise time delays controllable by an external signal will permit adjusting the individual pulse emission triggers to insure that maximum pulse overlap has occurred in the portion of the surveillance region where ARM attack is most likely.

4. The frequency of the r.f. emission from each radar must be synchronized and stabilized to ensure that no inadvertent phase modulation is introduced into any pulse emission. These inadvertent phase modulations are most important for ensuring minimal cross correlation between the emissions from separate radars. For example, suppose $\Delta f$ is the maximum r.f. frequency difference to be allowed between any pair of radars in the net during the time between successive synchronizations actions of the r.f. sources. Then in order to ensure minimal inadvertent phase modulation:

$$\Delta fT << 1$$

where T is the length of the pulse emission from each radar.

5. The final consideration pertains to the phase and/or amplitude codes employed at each radar site. These codes must satisfy the requirement that:

(a) The autocorrelation of each code must have uniformly low sidelobes as nearly equal to $(1/N^2)$ in power with respect to its peak as possible. Here N is the number of code bits per pulse emission.

(b) The cross correlation between the codes must be uniformly low ($1/N^2$ in power). The design of these codes may be implemented as follows:

Let the pulse emission from radar 1 consist of N equally spaced, contiguous sub pulses with the phase in each sub pulse being $\phi_i^1$, $i = 1, 2, \ldots, N$.

Similarly, the phase of each of the N sub pulses in the emission from radar 2 is $\phi_{i2}$, $i = 1, 2, \ldots, N$. the $k^{th}$ sidelobe power in the autocorrelation function of the phase coded pulse from radar 1 is proportional to:

$$\left| \sum_{m=k}^{N} e^{j(\phi_m^l - \phi_{m-k+1}^l)} \right|^2 \quad \begin{array}{l} k = 2, 3, \ldots, N-1 \\ 1 = 1, 2. \end{array}$$

When $k = N$, the relative sidelobe is 1, uncontrolled by the choice of phase modulation.

Similarly, the power in the $k^{th}$ lobe of the cross correlation function is:

$$\left| \sum_{m=k}^{N} e^{j(\phi_m - \phi_{m-k+1})} \right|^2 \quad k = 1, 2, \ldots N-1$$

In this case, the mainlobe power (k=1) is included since this mainlobe power must be minimized in the cross correlation. As before the k=N term is eliminated.

Consider now a weighted sum of the interference power terms, $$C = \sum_{l=1}^{2} \sum_{k=2}^{N-1} W_k^l \left| \sum_{m=k}^{N} j(\phi_m^l - \phi_{m-k+1}^l) \right|^2$$

$$+ \sum_{k=1}^{N-1} V_k \left| \sum_{m=k}^{N} e^{j(\phi_m^1 - \phi_{m-k+1}^2)} \right|^2.$$

The technique is to minimize C by selection of the phase code sequence $$\{\phi_m^1\} \text{ and } \{\phi_m^1\}.$$

An iterative numerical procedure such as gradient search must be employed in the minimization process. The sequence of weights $$\{W_k^1\}, \{W_k^2\} \text{ and } \{V_k\}$$

are used to place stress in the minimization process upon power in certain range sidelobe regions. The weight sequence must obey the normalization:

$$\sum_{l=1}^{2} \sum_{k=2}^{N-1} W_k^l + \sum_{k=1}^{N-1} V_k = 1.$$

The weights are particularly useful in iterative design procedures. If the initial minimization of C with uniform weights produces code waveforms with unacceptably high range sidelobe levels, these levels receive increased weights in subsequent minimization of the quality criterion C. The above design procedure has been discussed for two phase code sequences $$\phi_m^1 \text{ and } \phi_m^2$$

but is clearly extended to an arbitrary number of phase and/or amplitude code sequences.

The following specific design of a 3 bit phase code was accomplished with a programmable calculator using uniform weights. It demonstrates in a simple case the existence of the orthogonal phase codes. In this case:

$$\phi_1^1 = 230° \qquad \phi_1^2 = -9°$$
$$\phi_2^1 = 27° \qquad \phi_2^2 = 86°$$
$$\phi_3^1 = 19° \qquad \phi_3^2 = -12°.$$

The range sidelobe levels for Code 1 are −17.5 and −9.5 dB and for Code 2 they are −22.4 and −9.5 dB. The cross correlation presents −6.2, −7.6 and −9.5 dB. The cross correlation presents −6.2, −7.6 and −9.5 dB levels for 0, 1 and 2 bit shifts respectively. The autocorrelation range sidelobes are excellent for a three bit code but the cross correlation levels should be better. A second iteration with increased V weights would improve these cross correlation levels.

Although the invention has been described with reference to a particular embodiment, it will be understood to those skilled in the art that the invention is capable of a variety of alternative embodiments within the spirit and scope of the appended claims.

What is claimed is:

1. A netted search radar system to defeat monopulse anti-radiation missiles comprising in combination:
    a plurality of search radar units at fixed locations operating simultaneously and scanning asynchronously, each of said plurality of search radar units comprises in combination:
        an R.F. generator to provide an R.F. carrier frequency, said R.F. generator including a mixer to receive a modulation source, each of said plurality of search radar units operating at substantially the same R.F. carrier frequency,
        a modulation means connected to said mixer in order to modulate said R.F. carrier frequency thereby providing a modulated signal, said modulation means utilizing one of a plurality of selectable modulation codes which is different from that of all other search radar units,
        a T/R switch receiving said modulated signal from said mixer, said T/R switch applying said modulated signal to an antenna for transmission, said modulated signal being radiated to a target in a surveillance region to produce a reflected target return signal, the reflected target return signals from all of said plurality of search radar units are combined in space to comprise a received signal for reception by said antenna and applied to said T/R switch,
        a receiver/processor unit connected to said T/R switch having said received signal applied thereto, said receiver/processor unit processing said received signal containing said plurality of returned modulation codes to selectively detect the modulation code that was transmitted by its own search radar unit, said receiver/processor unit providing target data, and;
    a radar control unit electronically linked with each of said plurality of search radar units, said radar control unit controls the selection of the R.F. carrier frequency within each R.F. generator of said plurality of search radar units, said radar control unit periodically locking said R.F. carrier frequency to an external source within radar control unit to maintain R.F. carrier frequency stability, said radar control unit selecting a different modulation code for each of said plurality of search radar units, said radar control unit providing timing signals to each of said plurality of search radar units which synchronizes the triggering of said modulation means and provides for a specific delay of each modulated signal to insure an overlap in signal transmission in the surveillance region.

2. A netted search radar system as described in claim 1 wherein said plurality of search radar units equals two.

3. A netted search radar system as described in claim 1 wherein the number of said plurality of search radar units is greater than two.

4. A netted search radar system as described in claim 1 wherein said modulation means utilizes pulse amplitude modulation.

5. A netted search radar system as described in claim 1 wherein said modulation means utilizes pulse phase code modulation.

6. A netted search radar system as described in claim 1 wherein said plurality of codes are orthogonal pulse codes.

7. A netted search radar system as described in claim 1 wherein said operating codes during a given transmission period are different from each other for each of said plurality of search radar units.

8. A netted search radar system as described in claim 1 wherein each of said plurality of search radar units is fixed and known in position with respect to the others.

* * * * *